US012591054B2

(12) United States Patent
  Isoda

(10) Patent No.: US 12,591,054 B2
(45) Date of Patent: Mar. 31, 2026

(54) RADAR SIGNAL PROCESSING DEVICE, RADAR DEVICE, AND RADAR SIGNAL PROCESSING METHOD

(71) Applicant: Mitsubishi Electric Corporation, Tokyo (JP)

(72) Inventor: Kentaro Isoda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 375 days.

(21) Appl. No.: 18/210,222

(22) Filed: Jun. 15, 2023

(65) Prior Publication Data

US 2023/0341538 A1      Oct. 26, 2023

Related U.S. Application Data

(63) Continuation of application No. PCT/JP2021/004861, filed on Feb. 10, 2021.

(51) Int. Cl.
  *G01S 13/58*      (2006.01)
  *G01S 7/292*      (2006.01)
  *G01S 7/41*      (2006.01)

(52) U.S. Cl.
  CPC .......... *G01S 13/586* (2013.01); *G01S 7/2925* (2013.01); *G01S 7/415* (2013.01)

(58) Field of Classification Search
  CPC ....... G01S 13/586; G01S 7/2925; G01S 7/415
  See application file for complete search history.

(56) References Cited

U.S. PATENT DOCUMENTS

| | | | | |
|---|---|---|---|---|
| 5,990,823 A | * | 11/1999 | Peele ..................... | G01S 13/26 |
| | | | | 342/202 |
| 2004/0252047 A1 | * | 12/2004 | Miyake ................. | G01S 13/931 |
| | | | | 342/107 |
| 2006/0109169 A1 | * | 5/2006 | Winter .................. | G01S 13/345 |
| | | | | 342/111 |
| 2008/0272956 A1 | * | 11/2008 | Pedersen .............. | G01S 13/584 |
| | | | | 342/107 |
| 2015/0331096 A1 | * | 11/2015 | Schoor .................. | G01S 13/345 |
| | | | | 342/112 |

FOREIGN PATENT DOCUMENTS

JP      2011-43476 A      3/2011

OTHER PUBLICATIONS

Chen et al., "Phase Cancellation for Synthesizing Range Profile of Target with Micro-motion", IEEE, 2006 CIE International Conference on Radar, Oct. 16-19, 2006, total 4 pages.
Fei et al., "A New Method of Velocity Estimation for Inverse V-Shape Stepped Frequency Signal", IEEE, 2006 CIE International Conference on Radar, Oct. 16-19, 2006, total 3 pages.

(Continued)

*Primary Examiner* — William Kelleher
*Assistant Examiner* — Hailey R Le
(74) *Attorney, Agent, or Firm* — Birch, Stewart, Kolasch & Birch, LLP

(57)      ABSTRACT

Disclosed is a radar signal processing device including a shift unit to shift either one of an ascending sequence signal in which the frequency of a pulse wave rises discretely with time and a descending sequence signal in which the frequency of a pulse wave falls discretely with time.

7 Claims, 8 Drawing Sheets

(56)                    References Cited

OTHER PUBLICATIONS

Haotian et al., "Study on Radar Target Imaging and Velocity Measurement Simultaneously Based on Step Frequency Waveforms", IEEE, Synthetic Aperture Radar 2007, 1st Asian and Pacific Conference, Nov. 2007, pp. 404-407.
International Search Report (PCT/ISA/210), issued in PCT/JP2021/004861, dated Apr. 13, 2021.
Isoda et al., "Experimental Verification of a Doppler Velocity Measurement Method with Second Time Around Echo Suppression for Synthetic Bandwidth Radars", IEICE Trans. Commun., vol. E100-B, No. 10, Oct. 2017, pp. 1968-1975.
Zhu et al., "Simultaneously Velocity Measuring and HRR Profiling with a Novel CSF Sequence", IEEE, 2006 CIE International Conference on Radar, Oct. 16-19, 2006, total 5 pages.

* cited by examiner

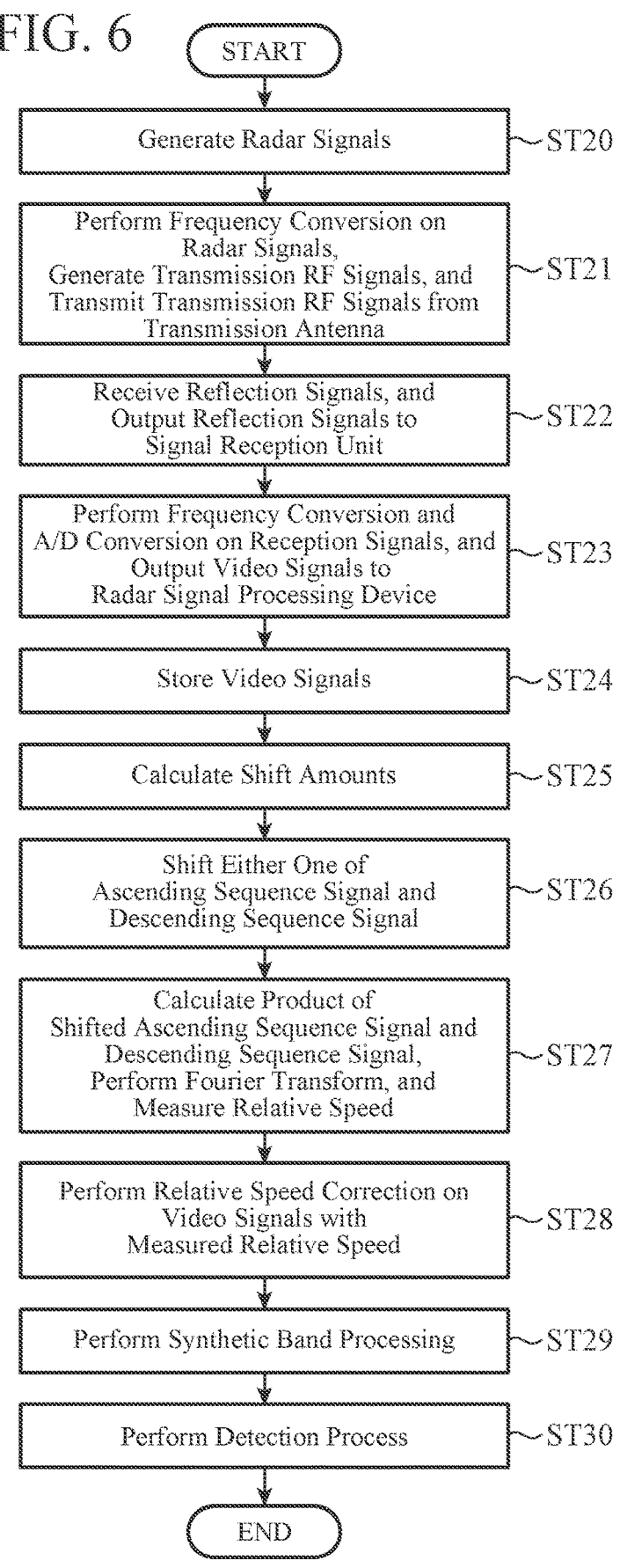

START

Generate Radar Signals ~ST20

Perform Frequency Conversion on
Radar Signals,
Generate Transmission RF Signals, and
Transmit Transmission RF Signals from
Transmission Antenna ~ST21

Receive Reflection Signals, and
Output Reflection Signals to
Signal Reception Unit ~ST22

Perform Frequency Conversion and
A/D Conversion on Reception Signals, and
Output Video Signals to
Radar Signal Processing Device ~ST23

Store Video Signals ~ST24

Calculate Shift Amounts ~ST25

Shift Either One of
Ascending Sequence Signal and
Descending Sequence Signal ~ST26

Calculate Product of
Shifted Ascending Sequence Signal and
Descending Sequence Signal,
Perform Fourier Transform, and
Measure Relative Speed ~ST27

Perform Relative Speed Correction on
Video Signals with
Measured Relative Speed ~ST28

Perform Synthetic Band Processing ~ST29

Perform Detection Process ~ST30

END

RADAR SIGNAL PROCESSING DEVICE, RADAR DEVICE, AND RADAR SIGNAL PROCESSING METHOD

CROSS REFERENCE TO RELATED APPLICATIONS

This application is a Continuation of PCT International Application No. PCT/JP2021/004861 filed on Feb. 10, 2021, which is hereby expressly incorporated by reference into the present application.

TECHNICAL FIELD

The present disclosure relates to a radar signal processing device.

BACKGROUND ART

In radar devices, synthetic band processing is provided as one of methods of improving a distance resolution without widening the band of a receiver. A radar device that performs the synthetic band processing (synthetic bandwidth radar (SBR)) transmits a transmission signal containing a sequence signal in which the frequency of a pulse wave varies discretely with time. This radar device then down-converts a reception signal using the same frequency as the frequency of the transmission signal, thereby converting the reception signal into a received video signal, and performs an inverse Fourier transform in a frequency direction on the received video signal converted thereby, thereby acquiring information about the distance to a target.

In the above-mentioned synthetic band processing, in order to acquire one range profile, a large number of pulse signals are transmitted and received, the number of pulse signals being large compared with those in pulse compression techniques which are techniques having a high distance resolution typically used in radar devices. Therefore, because the synthetic band processing needs an observation time which is long compared with those of the pulse compression techniques, it is known that the characteristics of the received video signal degrade remarkably because of the influence of the relative speed with respect to the target. Therefore, in the synthetic band processing, the relative speed with respect to the target is measured, and the received video signal is corrected on the basis of the measured relative speed (for example, refer to Patent Literature 1).

CITATION LIST

Patent Literature

Patent Literature 1: JP 2011-043476 A

SUMMARY OF INVENTION

Technical Problem

A problem with the synthetic band processing as above is that when the target has only one reflection point from which the transmission signal transmitted by the radar device is reflected, the relative speed with respect to the target can be measured accurately, whereas when multiple reflection points are present, the relative speed with respect to the target cannot be measured accurately because an unnecessary peak occurs at the time of the relative speed measurement.

The present disclosure is made in order to solve the above-mentioned problem, and it is therefore an object of the present disclosure to provide a technique of accurately measuring a relative speed with respect to a target.

Solution to Problem

A radar signal processing device according to the present disclosure includes: shift circuitry to shift either one of an ascending sequence signal in which the frequency of a pulse wave rises discretely with time and a descending sequence signal in which the frequency of a pulse wave falls discretely with time; relative speed measurement circuitry to calculate the product of the ascending sequence signal and the descending sequence signal either one of which is shifted by the shift circuitry, and to measure a relative speed with respect to a target by performing a Fourier transform on the calculated product; and relative speed correction circuitry to perform a relative speed correction on each of the ascending sequence signal and the descending sequence signal on the basis of the relative speed measured by the relative speed measurement circuitry.

Advantageous Effects of Invention

According to the present disclosure, the relative speed with respect to the target can be measured accurately.

BRIEF DESCRIPTION OF DRAWINGS

FIG. 1 is a block diagram showing the configuration of a radar device according to Embodiment 1;

FIG. 6 is a flowchart showing a transmission and reception method used by the radar device according to Embodiment 2, and a radar signal processing method used by a radar signal processing device;

DESCRIPTION OF EMBODIMENTS

Figure 2:
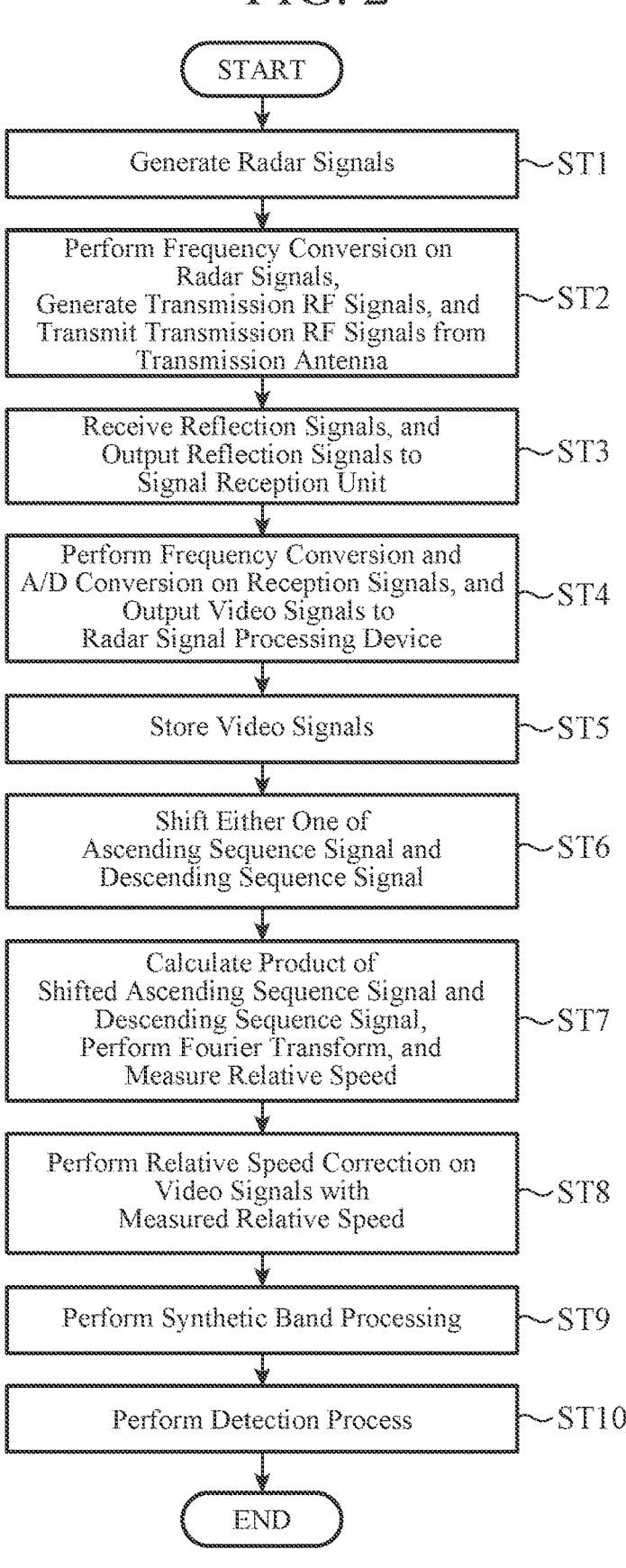
FIG. 2 is a flowchart showing a transmission and reception method used by the radar device according to Embodiment 1, and a radar signal processing method used by a radar signal processing device.

Hereinafter, in order to explain the present disclosure in greater detail, embodiments of the present disclosure will be explained with reference to the accompanying drawings.

Embodiment 1

Figure 1:
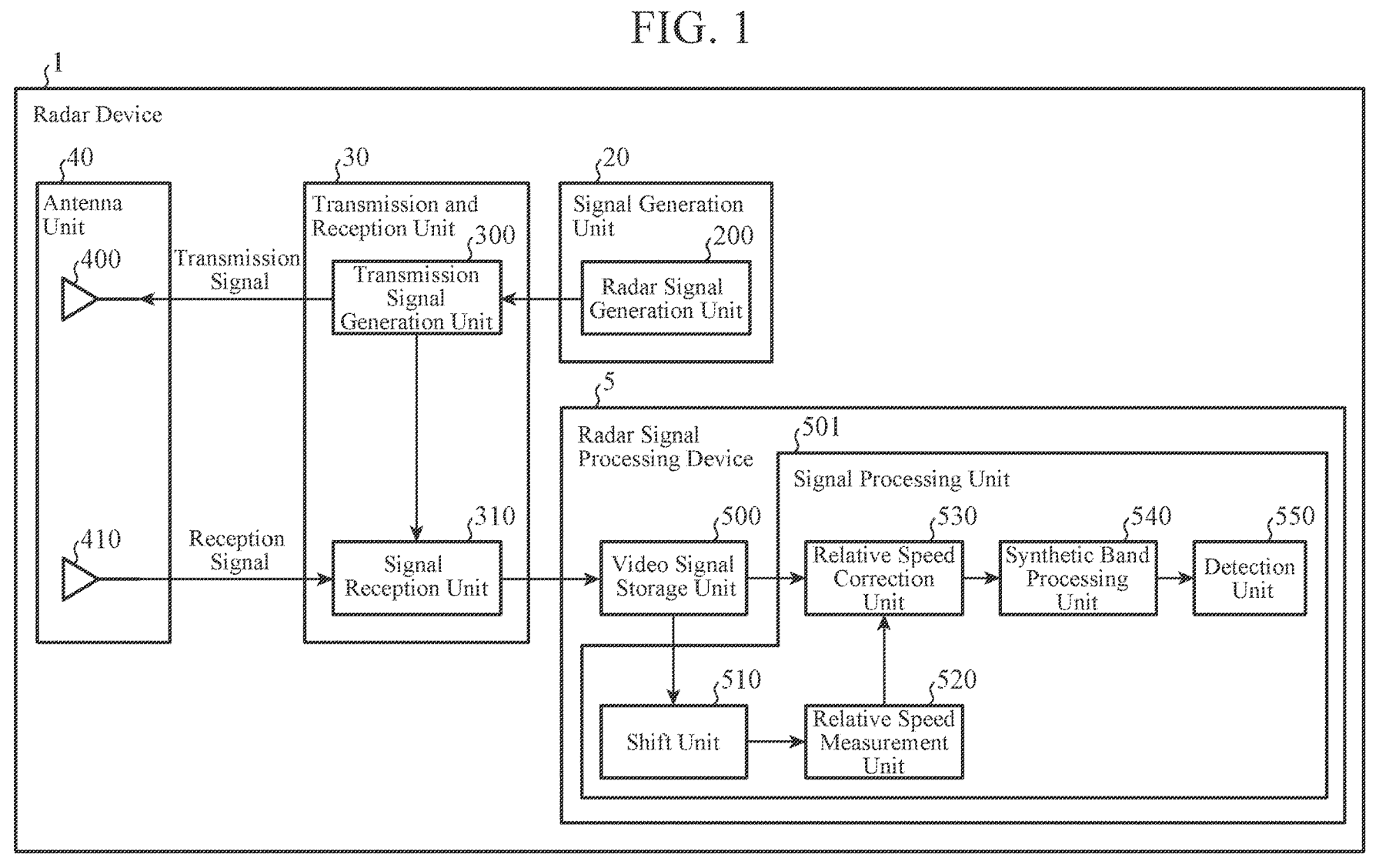

FIG. 1 is a block diagram showing the configuration of a radar device 1 according to Embodiment 1. As shown in FIG. 1, the radar device 1 includes a signal generation unit 20, a transmission and reception unit 30, an antenna unit 40, and a radar signal processing device 5. The signal generation unit 20 includes a radar signal generation unit 200. The transmission and reception unit 30 includes a transmission signal generation unit 300 and a signal reception unit 310. The antenna unit 40 includes a transmission antenna 400 and a reception antenna 410. The radar signal processing device 5 includes a video signal storage unit 500 and a signal processing unit 501. The signal processing unit 501 includes a shift unit 510, a relative speed measurement unit 520, a relative speed correction unit 530, a synthetic band processing unit 540, and a detection unit 550.

The radar signal generation unit 200 of the signal generation unit 20 generates an ascending sequence radar signal in which the frequency of a pulse wave rises discretely with time, and a descending sequence radar signal in which the frequency of a pulse wave falls discretely with time. The radar signal generation unit 200 outputs the ascending sequence radar signal and the descending sequence radar signal which are generated thereby to the transmission signal generation unit 300.

The transmission signal generation unit 300 of the transmission and reception unit 30 performs frequency conversion on the ascending sequence radar signal and the descending sequence radar signal which are generated by the radar signal generation unit 200, thereby generating an ascending sequence transmission RF signal and a descending sequence transmission RF signal, respectively. The transmission signal generation unit 300 outputs the ascending sequence transmission RF signal and the descending sequence transmission RF signal which are generated thereby to the transmission antenna 400 and the signal reception unit 310.

The transmission antenna 400 of the antenna unit 40 transmits the ascending sequence transmission RF signal and the descending sequence transmission RF signal which are generated by the transmission signal generation unit 300 to a target.

The reception antenna 410 of the antenna unit 40 receives an ascending sequence reflection signal and a descending sequence reflection signal which are caused by the reflection of the ascending sequence transmission RF signal and the descending sequence transmission RF signal, which are transmitted by the transmission antenna 400, from the target, thereby acquiring an ascending sequence reception signal and a descending sequence reception signal. The reception antenna 410 outputs the ascending sequence reception signal and the descending sequence reception signal which are acquired thereby to the signal reception unit 310.

As an example of the transmission antenna 400 and an example of the reception antenna 410, a subarray antenna constituted by some element antennas or the like is provided. Although in Embodiment 1 the configuration in which the antenna unit 40 of the radar device 1 includes the transmission antenna 400 and the reception antenna 410 is explained, the antenna unit is not limited to this configuration. For example, the antenna unit 40 of the radar device 1 may include a transmission and reception antenna having both the above-mentioned function of the transmission antenna 400 and the above-mentioned function of the reception antenna 410, such as a monostatic radar, instead of the transmission antenna 400 and the reception antenna 410.

The signal reception unit 310 of the transmission and reception unit 30 performs frequency conversion on each of the ascending sequence reception signal and the descending sequence reception signal which are acquired by the reception antenna 410, and converts each of the ascending sequence reception signal and the descending sequence reception signal on which the frequency conversion is performed thereby from analog signals to digital signals, thereby generating a video signal of the ascending sequence signal and a video signal of the descending sequence signal.

In further detail, in Embodiment 1, the signal reception unit 310 performs frequency conversion on the ascending sequence reception signal acquired by the reception antenna 410 on the basis of the ascending sequence transmission RF signal generated by the transmission signal generation unit 300, and performs frequency conversion on the descending sequence reception signal acquired by the reception antenna 410 on the basis of the descending sequence transmission RF signal generated by the transmission signal generation unit 300. Hereinafter, for the sake of simplicity, the video signal of the ascending sequence signal is simply referred to as the ascending sequence signal. Further, the video signal of the descending sequence signal is simply referred to as the descending sequence signal. The signal reception unit 310 outputs the ascending sequence signal and the descending sequence signal which are generated thereby to the video signal storage unit 500.

The video signal storage unit 500 of the radar signal processing device 5 stores the ascending sequence signal and the descending sequence signal which are generated by the signal reception unit 310. The video signal storage unit 500 outputs the ascending sequence signal and the descending sequence signal which are stored therein to each of the shift unit 510 and the relative speed correction unit 530.

The shift unit 510 of the signal processing unit 501 of the radar signal processing device 5 shifts either one of the ascending sequence signal in which the frequency of a pulse wave rises discretely with time, and the descending sequence signal in which the frequency of a pulse wave falls discretely with time. The shift in this case means the shifting of the arrangement of the sequence signal. In further detail, in Embodiment 1, the shift unit 510 shifts either one of the ascending sequence signal and the descending sequence signal which are stored by the video signal storage unit 500. The shift unit 510 outputs the signal shifted thereby and the signal not shifted thereby to the relative speed measurement unit 520.

The relative speed measurement unit 520 of the signal processing unit 501 of the radar signal processing device 5 calculates the product of the ascending sequence signal and the descending sequence signal either one of which is shifted by the shift unit 510, and measures the relative speed with respect to the target by performing a Fourier transform on the calculated product. The relative speed measurement unit 520 outputs the relative speed measured thereby to the relative speed correction unit 530.

The relative speed correction unit 530 of the signal processing unit 501 of the radar signal processing device 5 performs a relative speed correction on each of the ascending sequence signal and the descending sequence signal on the basis of the relative speed measured by the relative speed measurement unit 520. In further detail, in Embodiment 1, the relative speed correction unit 530 performs a relative speed correction on each of the ascending sequence signal and the descending sequence signal either one of which is not shifted yet by the shift unit 510 on the basis of the relative speed measured by the relative speed measurement unit 520. In further detail, in Embodiment 1, the relative speed correction unit 530 performs a relative speed correction on each of the ascending sequence signal and the descending sequence signal which are stored by the video signal storage unit 500 on the basis of the relative speed measured by the relative speed measurement unit 520. The relative speed correction unit 530 outputs the ascending sequence signal and the descending sequence signal on which the relative speed correction is performed thereby to the synthetic band processing unit 540.

The synthetic band processing unit 540 of the signal processing unit 501 of the radar signal processing device 5 performs synthetic band processing on the ascending sequence signal and the descending sequence signal on which the relative speed correction unit 530 performs the relative speed correction, thereby generating a synthetic signal. More concretely, for example, the synthetic band processing unit 540 sorts the ascending sequence signal and the descending sequence signal in ascending order on the basis of frequency, and performs an inverse Fourier transform in a frequency direction on the signals sorted thereby, thereby generating a range profile as the synthetic signal. The synthetic band processing unit 540 outputs the synthetic signal generated thereby to the detection unit 550.

The detection unit 550 of the signal processing unit 501 of the radar signal processing device 5 performs the detection of the target on the basis of the synthetic signal generated by the synthetic band processing unit 540. More concretely, for example, the detection unit 550 detects the distance to the target on the basis of the range profile which the synthetic band processing unit 540 generates as the synthetic signal. Although not illustrated, the radar device 1 may include a display unit that displays a result of the detection of the target detected by the detection unit 550.

Hereinafter, the operation of the radar device 1 according to Embodiment 1 will be explained by referring to a drawing. FIG. 2 is a flowchart showing a transmission and reception method used by the radar device 1 according to Embodiment 1, and a radar signal processing method used by the radar signal processing device 5. Each of steps ST1 to ST5 which will be explained hereinafter corresponds to the transmission and reception method used by the radar device 1, and each of steps ST6 to ST10 corresponds to the radar signal processing method used by the radar signal processing device 5.

As shown in FIG. 2, an ascending sequence radar signal in which the frequency of a pulse wave rises discretely with time, and a descending sequence radar signal in which the frequency of a pulse wave falls discretely with time are generated (step ST1). The radar signal generation unit 200 outputs the ascending sequence radar signal and the descending sequence radar signal which are generated thereby to the transmission signal generation unit 300.

Next, the transmission signal generation unit 300, in step ST2, performs frequency conversion on each of the ascending sequence radar signal and the descending sequence radar signal which are generated by the radar signal generation unit 200, thereby generating an ascending sequence transmission RF signal and a descending sequence transmission RF signal. Further, the transmission antenna 400, in step ST2, transmits the ascending sequence transmission RF signal and the descending sequence transmission RF signal which are generated by the transmission signal generation unit 300 to a target.

Next, the reception antenna 410 receives an ascending sequence reflection signal and a descending sequence reflection signal which are caused by the reflection of the ascending sequence transmission RF signal and the descending sequence transmission RF signal, which are transmitted by the transmission antenna 400, from the target, thereby acquiring an ascending sequence reception signal and a descending sequence reception signal (step ST3). The reception antenna 410 outputs the ascending sequence reception signal and the descending sequence reception signal which are acquired thereby to the signal reception unit 310.

Next, the signal reception unit 310 performs frequency conversion on each of the ascending sequence reception signal and the descending sequence reception signal which are acquired by the reception antenna 410, and converts each of the ascending sequence reception signal and the descending sequence reception signal on which the frequency conversion is performed thereby from analog signals to digital signals, thereby generating an ascending sequence video signal and a descending sequence video signal (step ST4). The signal reception unit 310 outputs the ascending sequence signal and the descending sequence signal which are generated thereby to the video signal storage unit 500.

Next, the video signal storage unit 500 stores the ascending sequence signal and the descending sequence signal (the received video signals) which are generated by the signal reception unit 310 (step ST5). The video signal storage unit 500 outputs the ascending sequence signal and the descending sequence signal which are stored thereby to each of the shift unit 510 and the relative speed correction unit 530.

Next, the shift unit 510 shifts either one of the ascending sequence signal and the descending sequence signal which are stored by the video signal storage unit 500 (step ST6). The shift unit 510 outputs the signal shifted thereby and the signal not shifted thereby to the relative speed measurement unit 520.

Next, the relative speed measurement unit 520 calculates the product of the ascending sequence signal and the descending sequence signal either one of which is shifted by the shift unit 510, and measures the relative speed with respect to the target by performing a Fourier transform on the calculated product (step ST7). The relative speed measurement unit 520 outputs the relative speed measured thereby to the relative speed correction unit 530.

Next, the relative speed correction unit 530 performs a relative speed correction on each of the ascending sequence signal and the descending sequence signal which are stored by the video signal storage unit 500 on the basis of the relative speed measured by the relative speed measurement unit 520 (step ST8). The relative speed correction unit 530 outputs the ascending sequence signal and the descending sequence signal on which the relative speed correction is performed thereby to the synthetic band processing unit 540.

Next, the synthetic band processing unit 540 performs synthetic band processing on the ascending sequence signal and the descending sequence signal on which the relative speed correction unit 530 performs the relative speed correction, thereby generating a synthetic signal (step ST9). The synthetic band processing unit 540 outputs the synthetic signal generated thereby to the detection unit 550.

Next, the detection unit 550 performs the detection of the target on the basis of the synthetic signal generated by the synthetic band processing unit 540 (step ST10).

Figure 3:
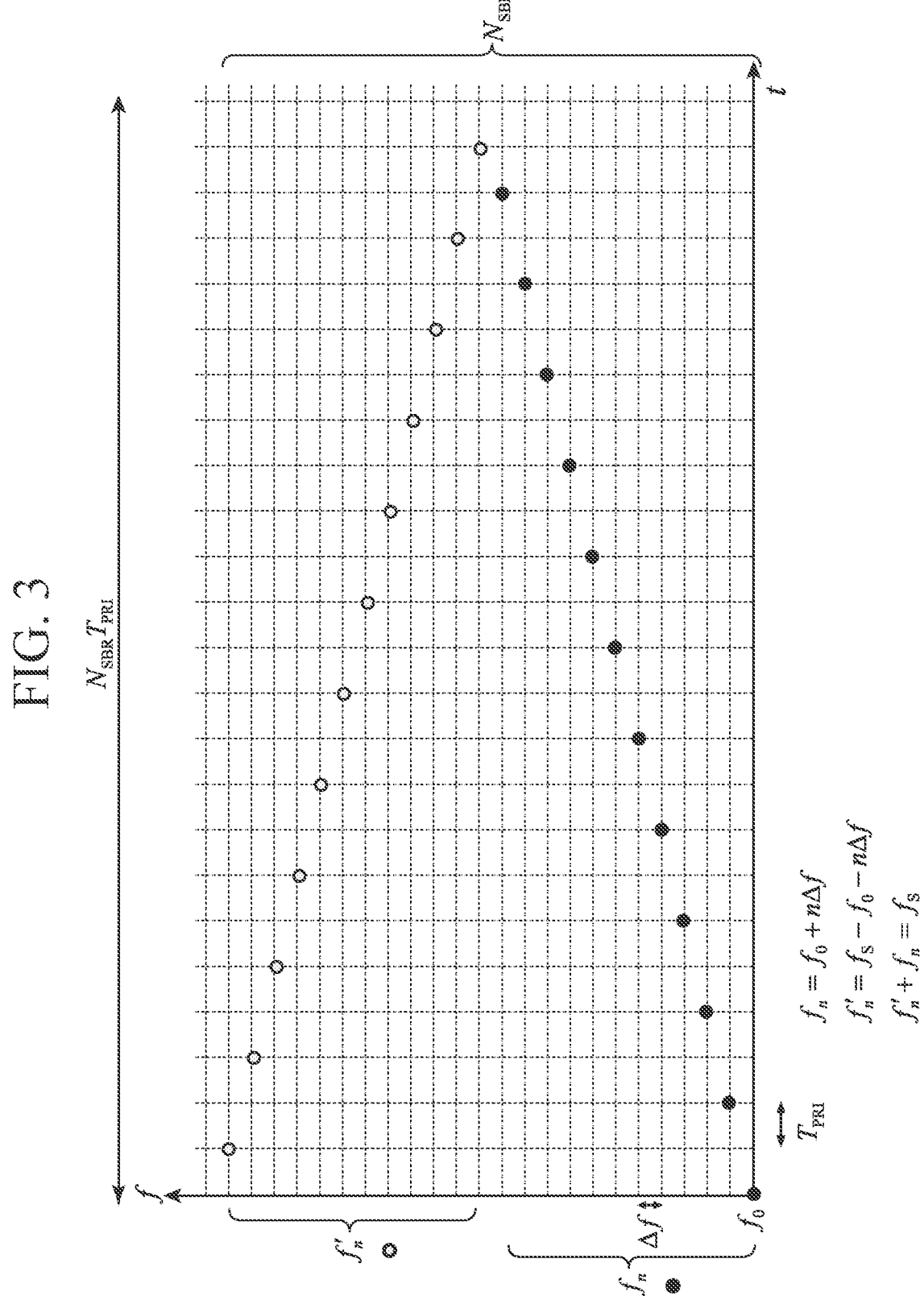
FIG. 3 is a graph showing an ascending sequence transmission RF signal and a descending sequence transmission RF signal according to a concrete example of Embodiment 1.

Hereinafter, a concrete example of the transmission and reception method used by the radar device 1 according to Embodiment 1 and a concrete example of the radar signal processing method used by the radar signal processing device 5 will be explained by referring to a drawing. FIG. 3 is a graph showing the ascending sequence transmission RF signal and the descending sequence transmission RF signal which the transmission antenna 400 according to the present concrete example transmits in above-mentioned step ST3. In FIG. 3, the horizontal axis shows a time and the vertical axis shows a transmission frequency. In FIG. 3, each division on the horizontal axis corresponds to a pulse repetition interval (PRI) $T_{PRI}$, and each division on the vertical axis corresponds to a minimum amount (step frequency $\Delta f$) of a frequency change of a pulse wave. In FIG. 3, each of black and white circles denotes the transmission frequency of a pulse wave at that time, and each black circle denotes the ascending sequence transmission RF signal and each white circle denotes the descending sequence transmission RF signal. The bandwidth $f_n$ of the ascending sequence transmission RF signal is expressed by $f_n = f_0 + n\Delta f$ ($f_0$ denotes a reference frequency and n denotes a positive integer). The bandwidth $f_n'$ of the descending sequence transmission RF signal is expressed by $f_n' = f_s - f_0 - n\Delta f$ ($f_s$ denotes a synthetic bandwidth). The synthetic bandwidth $f_s$ is expressed by $f_s = f_n' + f_n$. $N_{SBR}$ denotes the number of synthesized bands, and the interval of each of the sequences: the ascending sequence transmission RF signal and the descending sequence transmission RF signal is expressed by $N_{SBR}T_{PRI}$.

First, a concrete example in a case where the target has only a single reflection point is explained. In this case, it is assumed that the radar signal processing device 5 does not perform the process of above-mentioned step ST6. First, after above-mentioned step ST1, the transmission antenna 400, in above-mentioned step ST2, alternately transmits the ascending sequence transmission RF signal and the descending sequence transmission RF signal which are shown in FIG. 3 to the target.

Then, after each of the processes of above-mentioned steps ST3 to ST5, the relative speed measurement unit 520, in above-mentioned step ST7, performs complex multiplication of the ascending sequence signal and the descending sequence signal which are read from the video signal storage unit 500, performs a fast Fourier transform (FFT) on the signal obtained by the complex multiplication, and measures the relative speed with respect to the target on the basis of a peak value shown by the signal after the fast Fourier transform.

Next, the relative speed correction unit 530, in above-mentioned step ST8, performs a relative speed correction on each of the ascending sequence signal and the descending sequence signal on the basis of the relative speed measured by the relative speed measurement unit 520. Next, the synthetic band processing unit 540, in above-mentioned step ST9, sorts the ascending sequence signal and the descending sequence signal on which the relative speed correction unit 530 performs the relative speed correction in ascending order, and performs an inverse fast Fourier transform (IFFT) on the signals sorted thereby, thereby synthesizing the bands of the ascending sequence signal and the descending sequence signal.

Each of the above-mentioned processes will be explained hereinafter in greater detail. When a HIT number is denoted by n, the number of synthesized bands is denoted by $N_{SBR}$, the step frequency is denoted by f, the pulse repetition interval is denoted by $T_{PRI}$, the distance to the target is denoted by r, and the relative speed with respect to the target is denoted by $v_D$, the ascending sequence signal $s_A(n)$ which is a video signal is expressed by the following equation (1), and the descending sequence signal $s_D(n)$ which is a video signal is expressed by the following equation (2).

$$s_A(n) = \exp\left\{-j2\pi\frac{2r}{c}(f_0 + n\Delta f)\right\}\exp\left\{j2\pi\frac{2v_D}{c}(f_0 + n\Delta f)2T_{PRI}n\right\} \quad (1)$$

$$s_D(n) = \exp\left[-j2\pi\frac{2r}{c}\{f_0 + (N_{SBR}-1)\Delta f - n\Delta f\}\right]\cdot$$
$$\exp\left[j2\pi\frac{2v_D}{c}\{f_0 + (N_{SBR}-1)\Delta f - n\Delta f\}(2n+1)T_{PRI}\right] \quad (2)$$

The relative speed measurement unit 520, in above-mentioned step ST7, performs complex multiplication of the ascending sequence signal $s_A(n)$ expressed by the equation (1) and the descending sequence signal $s_D(n)$ expressed by the equation (2), thereby calculating $s_{AD}(n)$ expressed by the following equation (3).

$$s_{AD}(n) = s_A(n)s_D(n) = e^{j0}\exp\left[j2\pi\frac{2v_D}{c}\{4f_0 + (2N_{SBR}-3)\Delta f\}T_{PRI}n\right] \quad (3)$$

In the equation (3), the phase which is not related to n is denoted by $\theta$. Next, the relative speed measurement unit 520 performs a fast Fourier transform on $s_{AD}(n)$ expressed by the equation (3), thereby calculating D(k) expressed by the following equation (4).

$$D(k) = e^{j0}\sum_{n=0}^{N_{SBR}/2-1} e^{j2\pi\left[\{4f_0+(2N_{SBR}-3)\Delta f\}\frac{2v_D}{c}T_{PRI}-\frac{2k}{N_{SBR}}\right]n} \quad (4)$$

Next, the relative speed measurement unit 520 calculates k which maximizes D(k) expressed by the equation (4) as $k_D$ expressed by the following equation (5).

$$k_D = \frac{v_D T_{PRI} N_{SBR}}{c}\{4f_0 + (2N_{SBR}-3)\Delta f\} \quad (5)$$

Next, the relative speed measurement unit 520 calculates the relative speed $v_D$ with respect the target on the basis of $k_D$ expressed by the equation (5) and $\Delta v_D$ expressed by the following equation (7), according to the following equation (6).

$$v_D = \Delta v_D k_D \quad (6)$$

$$\Delta v_D = \frac{c}{T_{PRI}N_{SBR}\{4f_0 + (2N_{SBR}-3)\Delta f\}} \quad (7)$$

When the relative speed $v_D$ calculated, in step ST7, by the relative speed measurement unit 520 is denoted by V, the relative speed correction unit 530, in above-mentioned step ST8, performs a relative speed correction on the ascending sequence signal $s_A(n)$ expressed by the equation (1) on the basis of the relative speed V measured by the relative speed measurement unit 520, thereby calculating a relative-speed-corrected ascending sequence signal $s_{Ac}(n)$ expressed by the following equation (8).

$$s_{Ac}(n) = s_A(n)\exp\left\{-j2\pi\frac{2V}{c}(f_0 + n\Delta f)2T_{PRI}n\right\} \qquad (8)$$

The relative speed correction unit 530 also performs a relative speed correction on the descending sequence signal $s_D(n)$ expressed by the equation (2) on the basis of the relative speed V measured by the relative speed measurement unit 520, thereby calculating a relative-speed-corrected descending sequence signal $s_{Dc}(n)$ expressed by the following equation (9).

$$s_{Dc}(n) = s_D(n)\exp\left[-j2\pi\frac{2V}{c}\{f_0 + (N_{SBR} - 1)\Delta f - n\Delta f\}(2N + 1)T_{PRI}\right] \qquad (9)$$

Next, the synthetic band processing unit 540, in above-mentioned step ST9, sorts the relative-speed-corrected ascending sequence signal $s_{Ac}(n)$ expressed by the equation (8) and the relative-speed-corrected descending sequence signal $s_{Dc}(n)$ in ascending order, thereby generating s(n) expressed by the following equation (10).

$$s(n) = \exp\left\{-j2\pi\frac{2r}{c}(f_0 + n\Delta f)\right\} \qquad (10)$$

Next, the synthetic band processing unit 540 performs an inverse fast Fourier transform in a direction of n on s(n) expressed by the equation (10), thereby generating a range profile. Next, the detection unit 550, in above-mentioned step ST10, detects the distance to the target on the basis of a peak value shown by the range profile generated by the synthetic band processing unit 540.

Hereinafter, a concrete example in a case where the target has a first reflection point and a second reflection point will be explained. First, an example in which the radar signal processing device 5 does not perform the process of above-mentioned step ST6 in this case will be explained, thereby explaining the problem described in the present disclosure in greater detail.

Hereinafter, each of the amplitudes of the ascending sequence signal and the descending sequence signal of the video signals, which originate from the ascending sequence reflection signal and the descending sequence reflection signal which are reflected by the first reflection point which the target has, is assumed to be $A_1$. Further, each of the amplitudes of the ascending sequence signal and the descending sequence signal of the video signals, which originate from the ascending sequence reflection signal and the descending sequence reflection signal which are reflected by the second reflection point which the target has, is assumed to be $A_2$. Further, the distance to the first reflection point which the target has is assumed to be $r_1$. Further, the distance to the second reflection point which the target has is assumed to be $r_2$. Further, because an unnecessary peak appears in the signal after the above-mentioned fast Fourier transform in step ST7 even when the relative speed with respect to the target is 0, the relative speed with the respect to the target is assumed to be 0 in the concrete example explained hereinafter.

In the present concrete example, the ascending sequence signal $s_A(n)$ which is a video signal is expressed by the following equation (11), and the descending sequence signal $s_D(n)$ is expressed by the following equation (12).

$$s_A(n) = A_1\exp\left\{-j2\pi\frac{2r_1}{c}(f_0 + n\Delta f)\right\} + A_2\exp\left\{-j2\pi\frac{2r_2}{c}(f_0 + n\Delta f)\right\} \qquad (11)$$

$$s_D(n) = A_1\exp\left[-j2\pi\frac{2r_1}{c}\{f_0 + (N_{SBR} - 1)\Delta f - n\Delta f\}\right] + $$
$$A_2\exp\left[-j2\pi\frac{2r_2}{c}\{f_0 + (N_{SBR} - 1)\Delta f - n\Delta f\}\right] \qquad (12)$$

The relative speed measurement unit 520, in above-mentioned step ST7, performs complex multiplication of the ascending sequence signal $s_A(n)$ expressed by the equation (11) and the descending sequence signal $s_D(n)$ expressed by the equation (12), thereby calculating $s_{AD}(n)$ expressed by the following equation (13).

$$s_{AD}(n) = s_A(n)s_D(n) \qquad (13)$$
$$= A_1^2 e^{-j2\pi\frac{2r_1}{c}\{2f_0 + (N_{SBR}-1)\Delta f\}} + A_2^2 e^{-j2\pi\frac{2r_2}{c}\{2f_0 + (N_{SBR}-1)\Delta f\}} + $$
$$A_1 A_2 e^{-j2\pi\frac{2(r_1+r_2)}{c}f_0}\left[ e^{-j2\pi\frac{2\Delta f}{c}\{r_2(N_{SBR}-1)+n(r_1-r_2)\}} + e^{-j2\pi\frac{2\Delta f}{c}\{r_1(N_{SBR}-1)+n(r_1-r_2)\}}\right]$$

Each of the first and second terms on the right side of the equation (13) is a signal component on which a peak showing a true relative speed is superimposed, the first term originates from the first reflection point on the target, and the second term originates from the second reflection point on the target. The third term on the right side of the equation (13) is a signal component in which an unnecessary peak appears. When the relative speed measurement unit 520 performs a Fourier transform with respect to n on the first term in [ ] of the third term on the right side of the equation (13), the following equation (14) is acquired.

$$e^{j\theta}\sum_{n=0}^{N_{SBR}/2-1} e^{-j2\pi\frac{2\Delta f}{c}(r_1-r_2)n}e^{-j2\pi\frac{2nk}{N_{SBR}}} = e^{j\theta}\sum_{n=0}^{N_{SBR}/2-1} e^{j2\pi\left(-\frac{2\Delta f}{c}\delta r_{12}-\frac{2nk}{N_{SBR}}\right)n} \qquad (14)$$

In the equation (14), the phase which is not related to n is denoted by $\theta$. Next, the relative speed measurement unit 520 calculates k which maximizes the right side of the equation (14) as $k_u$ expressed by the following equation (15).

$$k_U = -\frac{N_{SBR}\Delta f}{c}\delta r_{12} \qquad (15)$$

In the equation (15), $\delta r_{12}=r_1-r_2$. Similarly, the relative speed measurement unit 520 performs a Fourier transform with respect to n on the second term in [ ] of the third term on the right side of the equation (13), and calculates k which maximizes the mathematical expression after the Fourier transform as further $k_U$ expressed by the following equation (16).

$$k_U = -\frac{N_{SBR}\Delta f}{c}\delta r_{12} \qquad (16)$$

Therefore, an unnecessary peak appears at a point which is distant from the true relative speed by the speed expressed by the following equation (17).

$$v_D = \pm \frac{N_{SBR}\Delta f}{c} \delta r_{12} \Delta v_D \tag{17}$$

There are roughly two problems with processing video signals originating from reflection signals from a target having multiple reflection points. The first problem is that such an unnecessary peak as shown above appears, and the second problem is that, in the equation (13), the first term on the right side originating from the first reflection point on the target and the second term originating from the second reflection point on the target have opposite phases, and cancel each other out.

In order to solve each of the above-mentioned problems, in Embodiment 1, the shift unit 510, in above-mentioned step ST6, shifts either one of the ascending sequence signal and the descending sequence signal. Hereinafter, an example in which the radar signal processing device 5 performs the process in above-mentioned step ST6 will be explained.

First, in the present concrete example, the shift unit 510, in above-mentioned step ST6, shifts the descending sequence signal $s_D(m)$ stored by the video signal storage unit 500, thereby generating $s_D(m+l)$. m is the HIT number, and l is the shift amount.

Next, the relative speed measurement unit 520, in above-mentioned step ST7, sets that $M=N_{SBR}/2$ and m=0 to M−1, and performs complex multiplication of the ascending sequence signal $s_A(m)$ and the descending sequence signal $s_D(m+l)$ shifted by the shift unit 510, thereby calculating $s_{AD}(m,l)$ expressed by the following equation (18).

$$s_{AD}(m, l) = s_A(m)s_D(m+l) \tag{18}$$
$$= A_1^2 e^{-j2\pi\frac{2r_1}{c}\{2f_0 + (N_{SBR}-1)\Delta f\}} e^{j2\pi\frac{2r_1}{c}\Delta fl} +$$
$$A_2^2 e^{-j2\pi\frac{2r_2}{c}\{2f_0 + (N_{SBR}-1)\Delta f\}} e^{j2\pi\frac{2r_2}{c}\Delta fl} + \ldots$$

In the equation (18), only the signal component on which the peak showing the true relative speed is superimposed is shown. When the phase of the first term on the right side of the equation (18) is denoted by $\phi_{A1}$ and the phase of the second term on the right side of the equation (18) is denoted by $\phi_{A2}$, the difference between these phases is expressed by the following equation (19).

$$\phi_{A1} - \phi_{A2} = -2\pi\frac{2}{c}\delta r_{12}\{2f_0 + (N_{SBR}-1)\Delta f\} + 2\pi\frac{2}{c}\delta r_{12}\Delta fl \tag{19}$$

In the equation (19), the first term on the right side shows a conventional phase difference when not performing the above-mentioned shifting, and the second term on the right side denotes a phase difference which varies dependently on the shift amount l and the distance $\delta r_{12}$ between the reflection points. It is seen from the equation (19) that it is possible to change the phase difference which is caused by the two reflection points on the target by changing the shift amount l.

Although the descending sequence signal is shifted in the above example, the shift unit 510, in above-mentioned step ST6, may shift the ascending sequence signal $s_A(m)$ instead of the descending sequence signal $s_D(m)$, thereby generating $s_A(m+l)$. In that case, the relative speed measurement unit 520, in above-mentioned step ST7, performs complex multiplication of the ascending sequence signal $s_A(m+l)$ shifted by the shift unit 510 and the descending sequence signal $s_D(m)$, thereby calculating $s_{AD}(m,l)$ expressed by the following equation (20).

$$s_{DA}(m, l) = s_A(m)s_D(m) \tag{20}$$
$$= A_1^2 e^{-j2\pi\frac{2r_1}{c}\{2f_0 + (N_{SBR}-1)\Delta f\}} e^{-j2\pi\frac{2r_1}{c}\Delta fl} +$$
$$A_2^2 e^{-j2\pi\frac{2r_2}{c}\{2f_0 + (N_{SBR}-1)\Delta f\}} e^{-j2\pi\frac{2r_2}{c}\Delta fl} + \ldots$$

When the phase of the first term on the right side of the equation (20) is denoted by $\phi_{D1}$ and the phase of the second term on the right side of the equation (20) is denoted by $\phi_{D2}$, the difference between these phases is expressed by the following equation (21).

$$\phi_{D1} - \phi_{D2} = -2\pi\frac{2}{c}\delta r_{12}\{2f_0 + (N_{SBR}-1)\Delta f\} - 2\pi\frac{2}{c}\delta r_{12}\Delta fl \tag{21}$$

The phase difference expressed by the equation (21) has a phase rotation opposite to that of the phase difference expressed by the equation (19). Hereinafter, the case in which the descending sequence signal is shifted is referred to as the ascending sequence reference, and the case in which the ascending sequence signal is shifted is referred to as the descending sequence reference. The shift amount l which causes the phase difference (the equation (19) or (21)) caused by the two reflection points to change by π is expressed by the following equation (22).

$$2\pi\frac{2}{c}\delta r_{12}\Delta fl = \pi \Leftrightarrow l = \frac{c}{4\delta r_{12}\Delta f} \tag{22}$$

As shown by the equation (22), l has a larger value as $\delta r_{12}$ decreases. Because $c/(2\Delta fN_{SBR})$ which is a distance resolution is considered to be a minimum distance difference, $l=N_{SBR}/2$ when, for example, $c/(2\Delta fN_{SBR})$ is substituted into $\delta r_{12}$ in the equation (22), and among all cases of l, a case in which the signal component originating from the above-mentioned first reflection point and the signal component originating from the second reflection point are in phase appears. In that case, the strength of the peak showing the true relative speed in the signal after the above-mentioned fast Fourier transform in step ST7 becomes stronger than those of other unnecessary peaks, and it is possible to accurately perform relative speed measurements. However, because the integral gain also changes as the shift amount changes, it is necessary to multiply the signal after the fast Fourier transform for each shift amount by $N_{SBR}/(N_{SBR}-2l)$ in accordance with the corresponding shift amount.

Summarizing the above, the shift unit 510, in above-mentioned step ST6, shifts either one of the ascending sequence signal $s_A(m)$ and the descending sequence signal $s_D(m)$ while changing the shift amount within the range of l=0 to ±(M−1).

The relative speed measurement unit 520, in above-mentioned step ST7, calculates the signal after the above-mentioned fast Fourier transform for each of the (2M−1) shift amounts of l=0 to ±(M−1), and calculates the relative speed with respect to the target on the basis of the signal whose peak showing the true relative speed has the highest strength out of those of the signals after the fast Fourier transform calculated for all the shift amounts.

The relative speed correction unit 530, in above-mentioned step ST8, performs a relative speed correction on each of the ascending sequence signal and the descending sequence signal on the basis of the relative speed measured by the relative speed measurement unit 520, according to the above-mentioned equations (8) and (9). The synthetic band processing unit 540, in above-mentioned step ST9, sorts the ascending sequence signal and the descending sequence signal on which the relative speed correction unit 530 performs the relative speed correction, and performs an inverse Fourier transform on the signals sorted thereby, thereby generating a range profile. The detection unit 550, in above-mentioned step ST10, detects the distance to the target on the basis of the peak value shown by the range profile generated by the synthetic band processing unit 540. By using the above configuration, it is possible to accurately measure the relative speed with respect to the target even when the target has multiple reflection points.

Each of the functions of the shift unit 510, the relative speed measurement unit 520, the relative speed correction unit 530, the synthetic band processing unit 540, and the detection unit 550, which are included in the signal processing unit 501 of the radar signal processing device 5 which the radar device 1 includes, is implemented by a processing circuit. More specifically, the signal processing unit 501 of the radar signal processing device 5 includes a processing circuit for performing the process of each of the steps shown in FIG. 2. This processing circuit may be either hardware for exclusive use or a central processing unit (CPU) that executes a program stored in a memory.

Figure 4A:
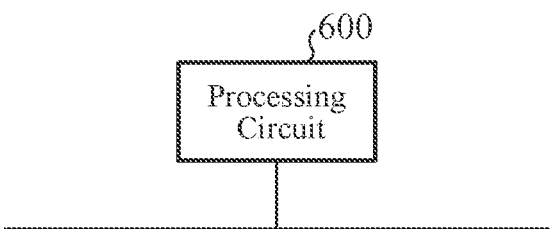
FIG. 4A is a block diagram showing a hardware configuration for implementing the functions of a signal processing unit of the radar signal processing device according to Embodiment 1.
Figure 4B:
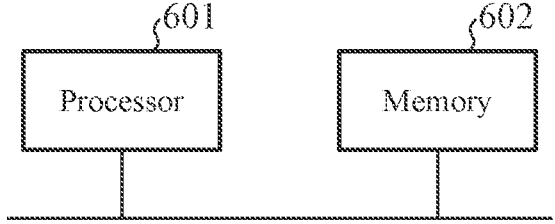
FIG. 4B is a block diagram showing a hardware configuration for executing software that implements the functions of the signal processing unit of the radar signal processing device according to Embodiment 1.

FIG. 4A is a block diagram showing a hardware configuration for implementing the functions of the signal processing unit 501 of the radar signal processing device 5. FIG. 4B is a block diagram showing a hardware configuration for executing software that implements the functions of the signal processing unit 501 of the radar signal processing device 5.

In a case where the above-mentioned processing circuit is the processing circuit 600 shown in FIG. 4A which is hardware for exclusive use, the processing circuit 600 is, for example, a single circuit, a composite circuit, a programmable processor, a parallel programmable processor, an application specific integrated circuit (ASIC), a field-programmable gate array (FPGA), or a combination of these circuits.

Each of the functions of the shift unit 510, the relative speed measurement unit 520, the relative speed correction unit 530, the synthetic band processing unit 540, and the detection unit 550, which are included in the signal processing unit 501 of the radar signal processing device 5, may be implemented by separate processing circuits, and those functions may be implemented collectively by a single processing circuit.

In a case where the above-mentioned processing circuit is a processor 601 shown in FIG. 4B, each of the functions of the shift unit 510, the relative speed measurement unit 520, the relative speed correction unit 530, the synthetic band processing unit 540, and the detection unit 550, which are included in the signal processing unit 501 of the radar signal processing device 5, is implemented by software, firmware, or a combination of software and firmware.

The software or the firmware is described as a program and the program is stored in a memory 602.

The processor 601 implements each of the functions of the shift unit 510, the relative speed measurement unit 520, the relative speed correction unit 530, the synthetic band processing unit 540, and the detection unit 550, which are included in the signal processing unit 501 of the radar signal processing device 5, by reading and executing programs stored in the memory 602. More specifically, the signal processing unit 501 of the radar signal processing device 5 includes the memory 602 for storing the programs in which the process in each of the steps shown in FIG. 2 is performed as a result when each of those functions is performed by the processor 601.

Those programs cause a computer to execute each of procedures or methods performed in the shift unit 510, the relative speed measurement unit 520, the relative speed correction unit 530, the synthetic band processing unit 540, and the detection unit 550 which are included in the signal processing unit 501 of the radar signal processing device 5. The memory 602 may be a computer readable storage medium in which the programs which cause a computer to function as the shift unit 510, the relative speed measurement unit 520, the relative speed correction unit 530, the synthetic band processing unit 540, and the detection unit 550 which are included in the signal processing unit 501 of the radar signal processing device 5 are stored.

The processor 601 is, for example, a central processing unit (CPU), a processing device, an arithmetic device, a processor, a microprocessor, a microcomputer, or a digital signal processor (DSP).

The memory 602 is, for example, a non-volatile or volatile semiconductor memory such as a random access memory (RAM), a read only memory (ROM), a flash memory, an erasable programmable read only memory (EPROM), or an electrically-EPROM (EEPROM), a magnetic disc such as a hard disc or a flexible disc, a flexible disc, an optical disc, a compact disc, a mini disc, a compact disc (CD), or a digital versatile disc (DVD).

Some of the functions of the shift unit 510, the relative speed measurement unit 520, the relative speed correction unit 530, the synthetic band processing unit 540, and the detection unit 550, which are included in the signal processing unit 501 of the radar signal processing device 5, may be implemented by hardware for exclusive use, and some of the functions may be implemented by software or firmware.

For example, each of the functions of the shift unit 510, the relative speed measurement unit 520, and the relative speed correction unit 530 is implemented by a processing circuit as hardware for exclusive use. The functions of the synthetic band processing unit 540 and the detection unit 550 may be implemented by the processor 601's reading and executing programs stored in the memory 602.

In this way, the processing circuit can implement each of the above-mentioned functions by using hardware, software, firmware, or a combination of hardware, software, and firmware.

As mentioned above, the radar signal processing device 5 according to Embodiment 1 includes: the shift unit 510 to shift either one of an ascending sequence signal in which the frequency of a pulse wave rises discretely with time and a descending sequence signal in which the frequency of a pulse wave falls discretely with time; the relative speed measurement unit 520 to calculate the product of the ascending sequence signal and the descending sequence signal either one of which is shifted by the shift unit 510, and to measure a relative speed with respect to a target by performing a Fourier transform on the calculated product; and the relative speed correction unit 530 to perform a relative speed correction on each of the ascending sequence signal and the descending sequence signal on the basis of the relative speed measured by the relative speed measurement unit 520.

According to the above-mentioned configuration, the strength of a peak showing a true relative speed at a time of a relative speed measurement can be improved by shifting either one of the ascending sequence signal and the descending sequence signal. As a result, even when the target has multiple reflection points and hence an unnecessary peak occurs, the relative speed with respect to the target can be accurately measured because it is easy to distinguish between the peak showing the true relative speed and the unnecessary peak.

The radar device 1 according to Embodiment 1 includes the radar signal processing device 5 according to Embodiment 1.

According to the above-mentioned configuration, the above-mentioned advantageous effect provided by the radar signal processing device 5 according to Embodiment 1 can be provided in the radar device 1.

The radar signal processing method according to Embodiment 1 includes: a shift step of shifting either one of an ascending sequence signal in which the frequency of a pulse wave rises discretely with time and a descending sequence signal in which the frequency of a pulse wave falls discretely with time; a relative speed measurement step of calculating the product of the ascending sequence signal and the descending sequence signal either one of which is shifted in the shift step, and measuring a relative speed with respect to a target by performing a Fourier transform on the calculated product; and a relative speed correction step of performing a relative speed correction on each of the ascending sequence signal and the descending sequence signal on the basis of the relative speed measured in the relative speed measurement step.

According to the above-mentioned configuration, the same advantageous effect as the above-mentioned advantageous effect provided by the radar signal processing device 5 according to Embodiment 1 can be provided.

Embodiment 2

In Embodiment 1, the configuration of shifting either one of the ascending sequence signal and the descending sequence signal is explained. In Embodiment 2, a configuration of calculating a shift amount will be explained.

Figure 5:
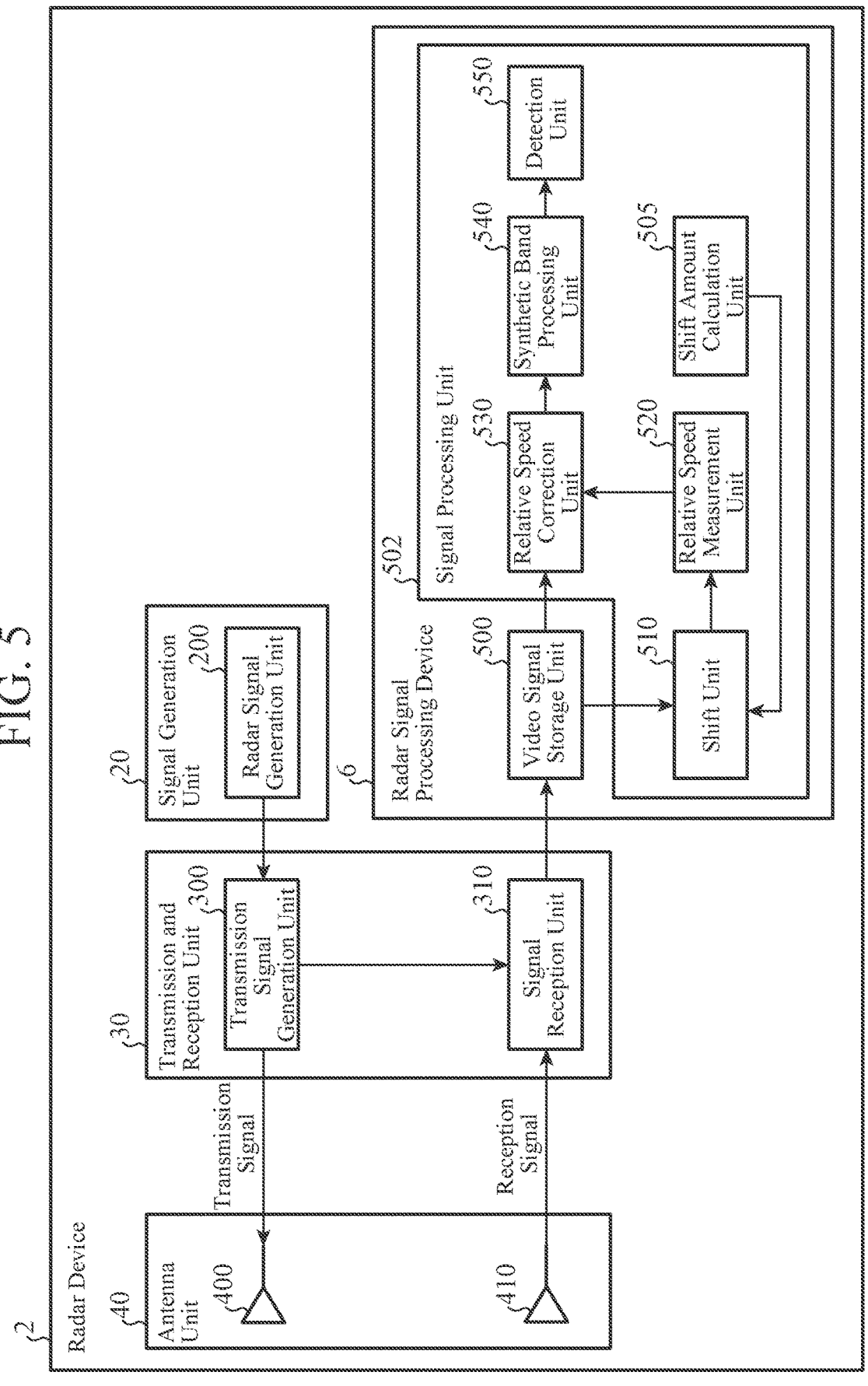
FIG. 5 is a block diagram showing the configuration of a radar device according to Embodiment 2.

Hereinafter, Embodiment 2 will be explained by reference to drawings. Components having the same functions as those of components explained in Embodiment 1 are denoted by the same reference signs, and an explanation of the components will be omitted hereinafter. FIG. 5 is a block diagram showing the configuration of a radar device 2 according to Embodiment 2. As shown in FIG. 5, in the radar device 2, a signal processing unit 502 of a radar signal processing device 6 further includes a shift amount calculation unit 505, in comparison with the radar device 1 according to Embodiment 1.

The shift amount calculation unit 505 calculates an amount by which a shift unit 510 shifts either one of an ascending sequence signal and a descending sequence signal. The shift amount calculation unit 505 outputs the shift amount calculated thereby to the shift unit 510.

As to the shift amount calculated by the shift amount calculation unit 505, the range of the shift amount to be calculated by the shift amount calculation unit 505 may be a predetermined range. In that case, an operator of the radar device 2 may preset the predetermined range.

The shift amount calculation unit 505 may set the range of the shift amount to be calculated by the shift amount calculation unit 505 on the basis of a distance resolution. The shift amount calculation unit 505 may set the interval between shift amounts to be calculated by the shift amount calculation unit 505 on the basis of an assumed target size. In other words, the shift amount calculation unit 505 may set the interval between adjacent shift amounts to be calculated by the shift amount calculation unit 505 on the basis of the assumed target size. The details of these configurations will be mentioned later.

The shift unit 510 according to Embodiment 2 shifts either one of the ascending sequence signal and the descending sequence signal by the shift amount calculated by the shift amount calculation unit 505.

Hereinafter, the operation of the radar device 2 according to Embodiment 2 will be explained by referring to a drawing. FIG. 6 is a flowchart showing a transmission and reception method used by the radar device 2 according to Embodiment 2, and a radar signal processing method used by the radar signal processing device 6. Each of steps ST20 to ST24 and ST26 to ST30 which will be explained hereinafter is the same as each of above-mentioned steps ST1 to ST10 explained in Embodiment 1. Therefore, an explanation of each of steps ST20 to ST24 and ST26 to ST30 will be omitted hereinafter.

As shown in FIG. 6, the shift amount calculation unit 505 calculates the shift amount by which the shift unit 510 shifts either one of the ascending sequence signal and the descending sequence signal (step ST25). The shift amount calculation unit 505 outputs the shift amount calculated thereby to the shift unit 510.

Hereinafter, a first concrete example of a shift amount calculation method used by the shift amount calculation unit 505 according to Embodiment 2 will be explained. In the first concrete example of the shift amount calculation method, the shift amount calculation unit 505 sets the range of the shift amount which the shift amount calculation unit 505 calculates in above-mentioned step ST25 on the basis of the distance resolution.

In the concrete example of Embodiment 1, it is explained that it is possible to accurately measure the relative speed with respect to the target by shifting either one of the ascending sequence signal and the descending sequence signal even when the target has multiple reflection points. However, a problem is that it is necessary to measure the relative speed with respect to the target for each of the (2M−1) shift amounts (M is one half of the number of hits), and it takes much time to perform arithmetic operations. In the present concrete example, a method of reducing the number of shift amounts used in order to measure the relative speed with respect to the target is provided.

When both the amplitude of a signal component originating from a first reflection point and the amplitude of a signal component originating from a second reflection point, the signal components being contained in the ascending sequence signal and the descending sequence signal which are video signals, are denoted by A, the amplitude $A_{12}$ of the vector sum is expressed by the following equation (23).

$$A_{12}=A\sqrt{2\{1+\cos(\phi_{A1}-\phi_{A2})\}} \tag{23}$$

In order for $A_{12}$ to be larger than the amplitude A of an unnecessary peak originating from each reflection point for discrimination against the unnecessary peak, the following equation (24) needs to be satisfied.

$$A\sqrt{2\{1 + \cos(\alpha_{A1} - \phi_{A2})\}} \ge A \Leftrightarrow \phi_{A1} - \phi_{A2} \le \frac{2}{3}\pi \tag{24}$$

17

In the equation (24), $\phi_{A1}-\phi_{A2}$ is the phase difference shown by the above-mentioned equation (19) (the phase difference originating from the two reflection points on the target). In order for the equation (24) to be satisfied in a case where the phase difference shown by the above-mentioned equation (19) is $\pi$ at a normal relative speed measurement time (l=0) when the shift unit 510 does not perform the shift process in above-mentioned step ST26, it is necessary to shift either one of the ascending sequence signal and the descending sequence signal with consideration given to an ascending sequence reference or a descending sequence reference, thereby changing the phase difference shown by the equation (19) by $\pi/3$.

Figure 7:
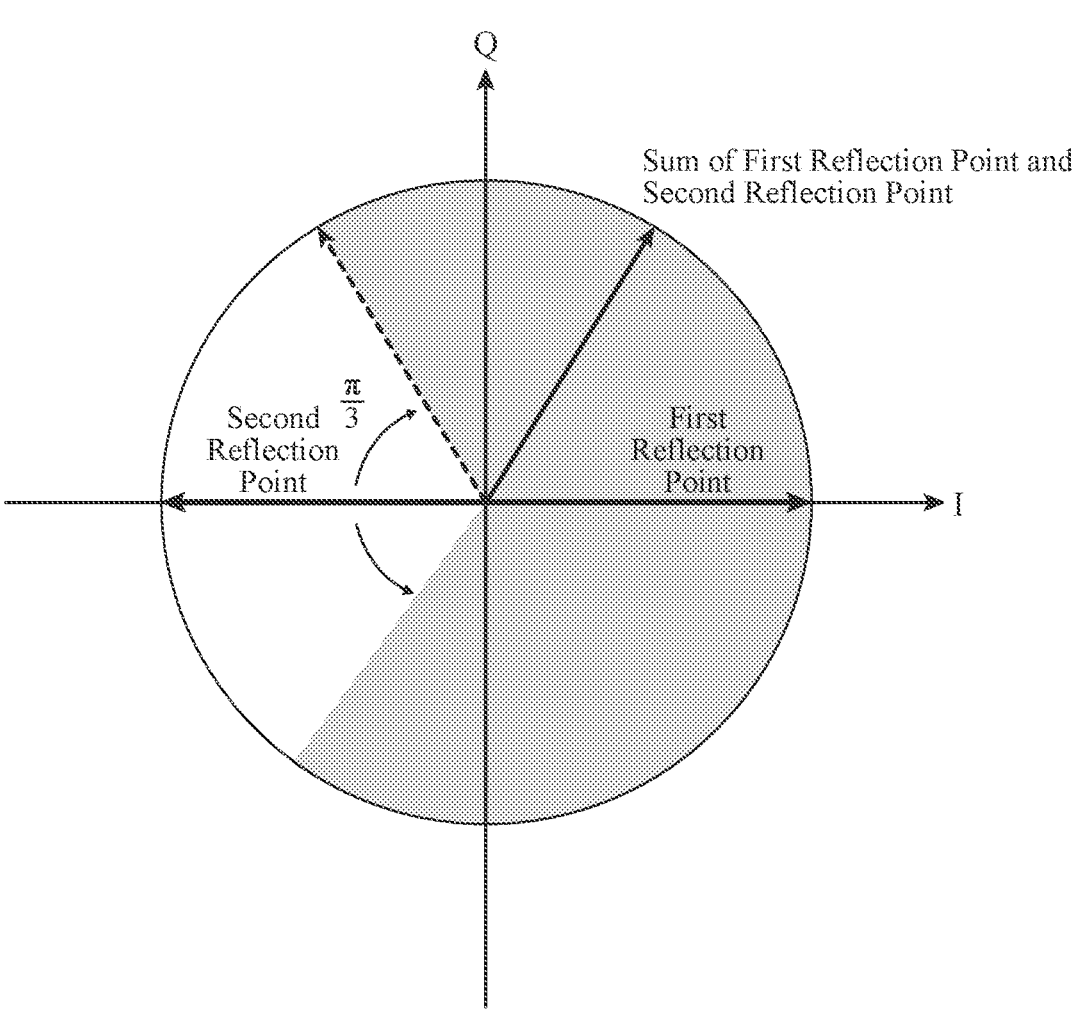
FIG. 7 is a graph showing the phase difference between the phase of a signal component originating from a first reflection point and the phase of a signal component originating from a second reflection point in a first concrete example of Embodiment 2.

FIG. 7 is a graph showing the phase difference between the phase of the signal component originating from the first reflection point, and the phase of the signal component originating from the second reflection point. In FIG. 7, the vertical axis is a real axis, and the horizontal axis is an imaginary axis. In FIG. 7, the graph is shown with respect to the phase of the signal component originating from the first reflection point. In FIG. 7, a portion shown in gray denotes the range of the phase difference satisfying the equation (24).

In a relative speed measurement method according to the present concrete example, it is seen from the second term on the right side of the equation (19) that the phase change per unit shift amount in the above-mentioned phase difference is expressed by $4\pi\delta r_{12}\Delta f/c$. Therefore, assuming that the smallest shift amount which causes the phase change to be greater than or equal to $\pi/3$ is denoted by $l_0$, the following equation (25) is derived.

$$\frac{4\pi\delta r_{12}\Delta f}{c}l_0 \geq \frac{\pi}{3} \Leftrightarrow l_0 = \left\lceil \frac{1}{6}\frac{c}{2\Delta f \delta r_{12}} \right\rceil \quad (25)$$

where $|x|$ is the smallest integer greater than $x$ ($x$ is an arbitrary expression)

In synthetic band processing, because $c/2\Delta f$ usually matches a range gate width ($r_g = cT_p/2$, where $T_p$ is a pulse width), the equation (25) is shown as the following equation (26).

$$l_0 = \left\lceil \frac{1}{6}\frac{r_g}{\delta r_{12}} \right\rceil \quad (26)$$

The distance difference $\delta r_{12}$ between the two reflection points on the target is needed at the time of determining $l_0$ using the equation (26). Although it is possible to determine $l_0$ if the reflection characteristic of the target is known, it is usually impossible to determine $l_0$. According to the equation (25), $l_0$ decreases as $\delta r_{12}$ increases. Therefore, in order to consider a worst case in which the smallest shift amount is large and the number of shift amounts used in order to measure the relative speed with respect to the target is large, it is necessary to expect a minimum of $\delta r_{12}$.

In the radar device, because the shortest distance difference between reflection points which makes it possible to assume that the target has multiple reflection points is the distance resolution, the minimum of $\delta r_{12}$ is expressed by the distance resolution. Therefore, $l_0$ in the above-mentioned worst case is expressed by the following equation (27).

18

$$l_0 = \left\lceil \frac{1}{6}\frac{r_g}{\Delta r} \right\rceil = \left\lceil \frac{N_{SBR}}{6} \right\rceil \quad (27)$$

For example, while in the case of $N_{SBR}=256$, the shift amount calculation unit 505 calculates the shift amount for 511 cases in consideration of the ascending sequence reference and the descending sequence reference, the shift amount calculation unit 505 accomplishes the calculation of the shift amount only for 87 cases by setting the range of the shift amount to be calculated thereby to the range from 0 to $l_0$ on the basis of the distance resolution. As mentioned above, in the present concrete example, the shift amount calculation unit 505 sets the range of the shift amount to be calculated in above-mentioned step ST25 on the basis of the distance resolution. As a result, the number of shift amounts used in order to measure the relative speed with respect to the target can be reduced, and the arithmetic load can be reduced.

Hereinafter, a second concrete example of the shift amount calculation method used by the shift amount calculation unit 505 according to Embodiment 2 will be explained. In the second concrete example of the shift amount calculation method, the shift amount calculation unit 505 sets the interval between shift amounts to be calculated by the shift amount calculation unit 505 on the basis of an assumed target size.

In the first concrete example, the example in which the shift amount calculation units 505 calculates all shift amounts on a one-by-one basis is explained. In the second concrete example, for a further reduction of the arithmetic load, the shift amount calculation unit 505 calculates a shift amount every other (or every third, fourth, . . . ) in such a way as to calculate 0, 2, 4, 6, . . . . . Hereinafter, the shift amount calculation method in which the target size is assumed will be explained.

Figure 8:
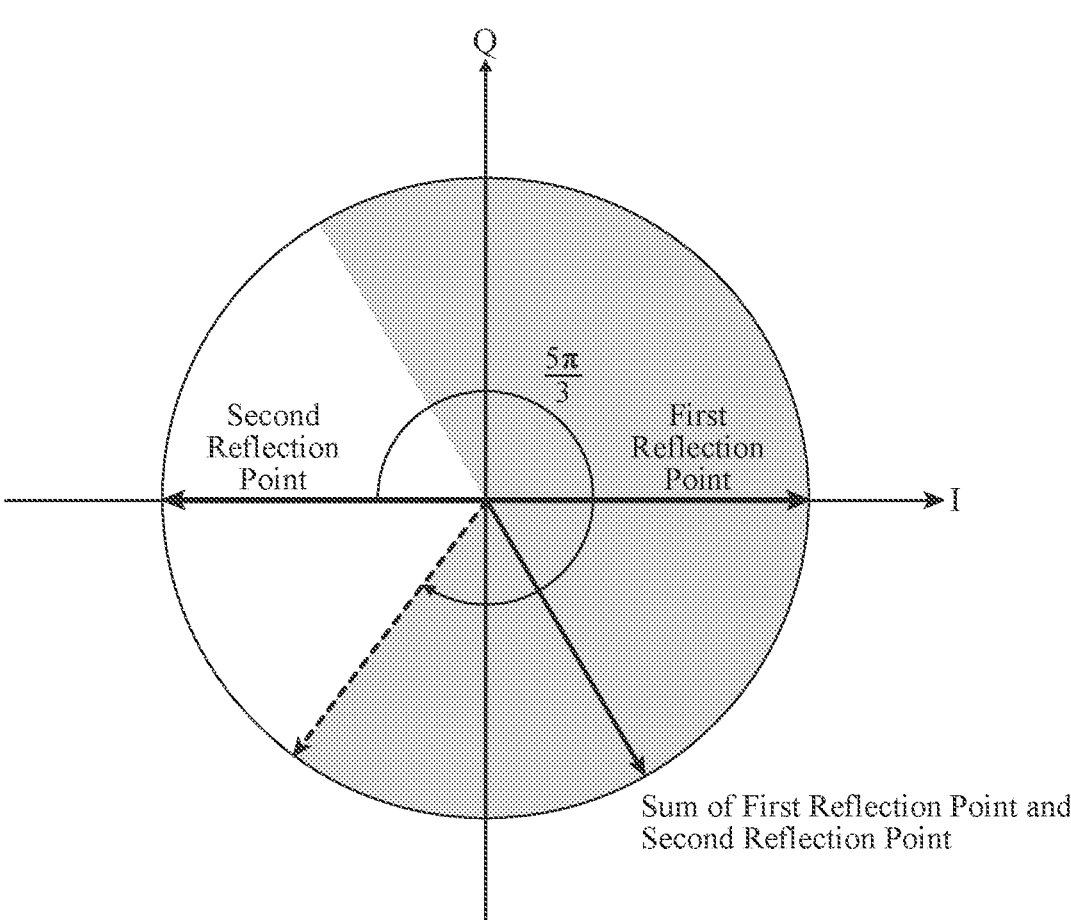
FIG. 8 is a graph showing the phase difference between the phase of a signal component originating from a first reflection point and the phase of a signal component originating from a second reflection point in a second concrete example of Embodiment 2.

When the assumed target size which is the assumed size of the target is denoted by L, the phase change per unit shift amount in the phase difference expressed by the above-mentioned equation (19) is expressed by $4\pi L\Delta f/c$. FIG. 8 is a graph showing the phase difference between the phase of the signal component originating from the first reflection point, and the phase of the signal component originating from the second reflection point. In FIG. 8, the vertical axis is a real axis, and the horizontal axis is an imaginary axis. In FIG. 8, the graph is shown with respect to the phase of the signal component originating from the first reflection point. In FIG. 8, a portion shown in gray denotes the range of the phase difference satisfying the equation (24).

As shown in FIG. 8, in order to make the phase difference originating from the two reflection points be less than or equal to $2\pi/3$ in the relative speed measurement processing, it is necessary to make the change in the phase difference per shift amount be less than or equal to $5\pi/3$. Therefore, when the largest shift amount which makes the phase change be less than or equal to $5\pi/3$ is denoted by $\Delta l$, the following equation (28) is derived.

$$\frac{4\pi L\Delta f}{c}\Delta l \leq \frac{5\pi}{3} \Leftrightarrow \Delta l = \left\lfloor \frac{5}{6}\frac{r_g}{L} \right\rfloor \quad (28)$$

where $|x|$ is the largest integer less than $x$ ($x$ is an arbitrary expression)

For example, it is seen from the equation (28) that, when it is assumed that the range gate width $r_g$ is 150 m and the assumed target size L is 15 m, the shift amount calculation unit 505 should just calculate the shift amount 0, 8, 16, . . . every eighth. As mentioned above, in this concrete example, the shift amount calculation unit 505 sets the interval between shift amounts to be calculated by the shift amount calculation unit 505 on the basis of the assumed target size. As a result, the number of shift amounts used in order to measure the relative speed with respect to the target can be reduced, and the arithmetic load can be reduced. As a matter of course, the shift amount calculation unit 505 may set the range of the shift amount to be calculated by the shift amount calculation unit 505 on the basis of the distance resolution, and set the interval between shift amounts to be calculated by the shift amount calculation unit 505 on the basis of the assumed target size, using a combination of the equation (27) and the equation (28). For example, in the case of $N_{SBR}$=256, the range gate width $r_g$=150 m, and the assumed target size L=15 m, it is seen that what is necessary is just to take into consideration one non-shifted case of l=0, and twelve cases: ascending sequence reference cases of l=8, 16, 24, 32, 40, and 46, and descending sequence reference cases l=8, 16, 24, 32, 40, and 46, and to calculate the shift amounts for the thirteen cases in total.

Each of the functions of the shift unit 510, the relative speed measurement unit 520, the relative speed correction unit 530, the synthetic band processing unit 540, the detection unit 550, and the shift amount calculation unit 505, which are included in the signal processing unit 502 of the radar signal processing device 6 according to Embodiment 2, is implemented by a processing circuit. More specifically, the signal processing unit 502 of the radar signal processing device 6 according to Embodiment 2 includes a processing circuit for performing the processes in steps ST20 to ST30 shown in FIG. 6. This processing circuit may be either hardware for exclusive use or a central processing unit (CPU) that executes a program stored in a memory. A hardware configuration which implements the functions of the signal processing unit 502 of the radar signal processing device 6 according to Embodiment 2 is the same as the hardware configuration explained using FIG. 4A in Embodiment 1. Further, a hardware configuration which executes software which implements the functions of the signal processing unit 502 of the radar signal processing device 6 according to Embodiment 2 is the same as the hardware configuration explained using FIG. 4B in Embodiment 1.

As mentioned above, the radar signal processing device 6 according to Embodiment 2 further includes the shift amount calculation unit 505 that calculates the shift amount by which the shift unit 510 shifts either one of the ascending sequence signal and the descending sequence signal.

According to the above-mentioned configuration, the strength of a peak showing a true relative speed at a time of a relative speed measurement can be improved by shifting either one of the ascending sequence signal and the descending sequence signal by the calculated shift amount. As a result, even when the target has multiple reflection points and hence an unnecessary peak occurs, the relative speed with respect to the target can be accurately measured because it is easy to distinguish between the peak showing the true relative speed and the unnecessary peak.

The range of the shift amount which the shift amount calculation unit 505 in the radar signal processing device 6 according to Embodiment 2 calculates is a predetermined range.

According to the above-mentioned configuration, by setting the predetermined range as appropriate, the number of shift amounts used in order to measure the relative speed with respect to the target can be reduced, and the arithmetic load can be reduced.

The shift amount calculation unit 505 in the radar signal processing device 6 according to Embodiment 2 sets the range of the shift amount to be calculated by the shift amount calculation unit 505 on the basis of the distance resolution.

According to the above-mentioned configuration, the range of the shift amount to be calculated can be suitably set in accordance with the distance resolution of the radar device 2.

As a result, the number of shift amounts used in order to measure the relative speed with respect to the target can be reduced, and the arithmetic load can be reduced.

The shift amount calculation unit 505 in the radar signal processing device 6 according to Embodiment 2 sets the interval between shift amounts to be calculated by the shift amount calculation unit 505 on the basis of the assumed target size.

According to the above-mentioned configuration, the interval between shift amounts to be calculated can be set suitably in accordance with the assumed size of the target. As a result, the number of shift amounts used in order to measure the relative speed with respect to the target can be reduced, and the arithmetic load can be reduced.

It is to be understood that an arbitrary combination of embodiments can be made, a change can be made in an arbitrary component of each of the embodiments, or an arbitrary component in each of the embodiments can be omitted.

INDUSTRIAL APPLICABILITY

Because the radar signal processing device according to the present disclosure can accurately measure a relative speed with respect to a target, the radar signal processing device can be used for radar devices.

REFERENCE SIGNS LIST

1, 2 radar device, 5, 6 radar signal processing device, 20 signal generation unit, 30 transmission and reception unit, 40 antenna unit, 200 radar signal generation unit, 300 transmission signal generation unit, 310 signal reception unit, 400 transmission antenna, 410 reception antenna, 500 video signal storage unit, 501 signal processing unit, 502 signal processing unit, 505 shift amount calculation unit, 510 shift unit, 520 relative speed measurement unit, 530 relative speed correction unit, 540 synthetic band processing unit, 550 detection unit, 600 processing circuit, 601 processor, and 602 memory.

The invention claimed is:

1. A radar signal processing device comprising:
   shift circuitry to shift either one of an ascending sequence signal in which a frequency of a pulse wave rises discretely with time and a descending sequence signal in which a frequency of a pulse wave falls discretely with time;
   relative speed measurement circuitry to calculate a product of the ascending sequence signal and the descending sequence signal either one of which is shifted by the shift circuitry, and to measure a relative speed with respect to a target by performing a Fourier transform on the calculated product;
   relative speed correction circuitry to perform a relative speed correction on each of the ascending sequence signal and the descending sequence signal on a basis of the relative speed measured by the relative speed measurement circuitry;

synthetic band processing circuitry to perform synthetic band processing on the ascending sequence signal and the descending sequencing signal on which the relative speed correction has been performed to generate a range profile of a synthetic signal; and detection circuitry to perform detection of a distance to a target based on the generated range profile.

2. The radar signal processing device according to claim 1, further comprising:

shift amount calculation circuitry to calculate a shift amount by which the shift circuitry shifts either one of the ascending sequence signal and the descending sequence signal.

3. The radar signal processing device according to claim 2, wherein a range of the shift amount calculated by the shift amount calculation circuitry is a predetermined range.

4. The radar signal processing device according to claim 2, wherein the shift amount calculation circuitry sets the range of the shift amount to be calculated by the shift amount calculation circuitry on a basis of a distance resolution.

5. The radar signal processing device according to claim 2, wherein the shift amount calculation circuitry sets an interval between shift amounts to be calculated by the shift amount calculation circuitry on a basis of an assumed target size.

6. A radar device comprising:

the radar signal processing device according to claim 1.

7. A radar signal processing method comprising:

shifting either one of an ascending sequence signal in which a frequency of a pulse wave rises discretely with time and a descending sequence signal in which a frequency of a pulse wave falls discretely with time;

calculating a product of the ascending sequence signal and the descending sequence signal either one of which is shifted, and measuring a relative speed with respect to a target by performing a Fourier transform on the calculated product;

performing a relative speed correction on each of the ascending sequence signal and the descending sequence signal on a basis of the measured relative speed;

performing synthetic band processing on the ascending sequence signal and the descending sequencing signal on which the relative speed correction has been performed to generate a range profile of a synthetic signal; and performing detection of a distance to a target based on the generated range profile.

* * * * *